(12) United States Patent
Daniel

(10) Patent No.: US 11,325,044 B2
(45) Date of Patent: May 10, 2022

(54) VIDEO GAME GUIDANCE SYSTEM

(71) Applicant: Sony Interactive Entertainment LLC, San Mateo, CA (US)

(72) Inventor: Alvin J. Daniel, Redwood Shores, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 138 days.

(21) Appl. No.: 16/295,693

(22) Filed: Mar. 7, 2019

(65) Prior Publication Data

US 2020/0282315 A1    Sep. 10, 2020

(51) Int. Cl.
*A63F 13/67* (2014.01)
*A63F 13/79* (2014.01)
*A63F 13/35* (2014.01)

(52) U.S. Cl.
CPC .............. *A63F 13/67* (2014.09); *A63F 13/35* (2014.09); *A63F 13/79* (2014.09)

(58) Field of Classification Search
None
See application file for complete search history.

(56) References Cited

U.S. PATENT DOCUMENTS

| | | | | |
|---|---|---|---|---|
| 6,005,545 | A * | 12/1999 | Nishida | G06F 3/04883 345/603 |
| 6,296,570 | B1 * | 10/2001 | Miyamoto | A63F 13/10 463/30 |
| 7,452,273 | B2 * | 11/2008 | Amaitis | A63F 13/80 463/22 |
| 8,882,582 | B2 * | 11/2014 | Avent | A63F 13/48 463/23 |
| 2003/0149496 | A1 * | 8/2003 | Johnson | A63B 24/0021 700/91 |
| 2012/0122067 | A1 | 5/2012 | Dohring | |
| 2013/0244774 | A1 | 9/2013 | Altieri | |

(Continued)

FOREIGN PATENT DOCUMENTS

| | | |
|---|---|---|
| CN | 108211362 | 6/2018 |
| TW | 1502562 | 10/2015 |
| WO | 2020180500 | 9/2020 |

OTHER PUBLICATIONS

Patent Cooperation Treaty; Written Opinion of the International Searching Authority issued in PCT Application No. PCT/US20/19161, dated May 19, 2020; 7 pages.

(Continued)

*Primary Examiner* — Reginald A Renwick
(74) *Attorney, Agent, or Firm* — Fitch, Even, Tabin & Flannery LLP

(57) ABSTRACT

A game guide system, method, and apparatus are provided. A system for providing computer simulated game guidance content, comprising a game guide database, a game objectives database, a network connector configured to communicate with a plurality of user devices over a network, and a control circuit. The control circuit is configured to receive a game guide request from a user, receive an audio segment recorded from a game by a user device associated with the user, identify the game and a game objective from the game objectives database based on the audio segment, select a content item in the game guide database based on the game objective, and provide the content item to the user.

18 Claims, 5 Drawing Sheets

(56) References Cited

U.S. PATENT DOCUMENTS

| | | | |
|---|---|---|---|
| 2014/0274353 A1* | 9/2014 | Benson | G06F 3/01 463/29 |
| 2014/0373036 A1 | 12/2014 | Phillips | |
| 2017/0091312 A1 | 3/2017 | Ajmera | |
| 2018/0280802 A1 | 10/2018 | Stroud | |

OTHER PUBLICATIONS

Patent Cooperation Treaty; International Search Report issued in PCT Application No. PCT/US20/19161, dated May 19, 2020; 2 pages.

Patent Cooperation Treaty; Notification of Transmittal of the International Search Report and the Written Opinion of the International Searching Authority issued in PCT Application No. PCT/US20/19161, dated May 19, 2020; 1 page.

Roc (Taiwan) Intellectual Property Office (IPO); Office Action issued in corresponding ROC (Taiwan) Patent Application No. 109106334; dated Sep. 7, 2021; 19 pages.

Roc (Taiwan) Intellectual Property Office (IPO); Patent Approval Certificate (Allowance Decision) issued in corresponding ROC (Taiwan) Patent Application No. 109106334; dated Dec. 17, 2021; 6 pages.

* cited by examiner

VIDEO GAME GUIDANCE SYSTEM

BACKGROUND OF THE INVENTION

1. Field of the Invention

The present invention relates generally to computer-simulated video games, and more specifically to providing game guide for video games.

2. Discussion of the Related Art

Printed strategy guides for video games have traditionally been published to provide players with hints and solutions for the games. Player communities also share walkthroughs and tips on the Internet. However, the conventional game strategy guide format is often not well suited for modern games with increasing complexity, variation, and degree of freedom.

SUMMARY OF THE INVENTION

One embodiment provides a system for providing computer simulated game guidance content, comprising a game guide database, a game objectives database, a network connector configured to communicate with a plurality of user devices over a network, and a control circuit coupled to the game guide database, the game objectives database, and the network connector. The control circuit being configured to receive, via the network connector, a game guide request from a user, receive, via the network connector, an recording from a game by a user device associated with the user, identify the game and a game objective from the game objectives database based on the recording, select a content item in the game guide database based on the game objective, and provide, to the user device via the network connector, the content item to the user.

Another embodiment provides a method for providing computer simulated game guidance content, comprising receiving, via a network connector coupled to a control circuit, a game guide request from a user, receiving, via the network connector, an recording from a game by a user device associated with the user, identifying, with the control circuit, identify the game and a game objective from a game objectives database based on the recording, selecting, with the control circuit, a content item in a game guide database based on the game objective, and providing, to the user device via the network connector, the content item to the user.

Another embodiment provides a non-transitory computer-readable storage medium storing one or more computer programs configured to cause a processor-based system to execute steps comprising receiving, via a network connector, a game guide request from a user, receiving, via the network connector, an recording recorded from a game by a user device associated with the user, identifying the game and a game objective from a game objectives database based on the recording, selecting a content item in a game guide database based on the game objective, and providing, to the user device via the network connector, the content item to the user.

Another embodiment provides a system for providing computer simulated game guidance content, comprising a game guide database, a game objectives database, a network connector configured to communicate with a plurality of user devices over a network, and a control circuit coupled to the game guide database, the game objectives database, and the network connector. The control circuit being configured to receive, via the network connector, a game guide request from a user, receive, via the network connector, an audio segment recorded from a game by a user device associated with the user, identify the game and a game objective from the game objectives database based on the audio segment, select a content item in the game guide database based on the game objective, and provide, to the user device via the network connector, the content item to the user.

Another embodiment provides a method for providing computer simulated game guidance content, comprising receiving, via a network connector coupled to a control circuit, a game guide request from a user, receiving, via the network connector, an audio segment recorded from a game by a user device associated with the user, identifying, with the control circuit, identify the game and a game objective from a game objectives database based on the audio segment, selecting, with the control circuit, a content item in a game guide database based on the game objective, and providing, to the user device via the network connector, the content item to the user.

Another embodiment provides a non-transitory computer-readable storage medium storing one or more computer programs configured to cause a processor-based system to execute steps comprising receiving, via a network connector, a game guide request from a user, receiving, via the network connector, an audio segment recorded from a game by a user device associated with the user, identifying the game and a game objective from a game objectives database based on the audio segment, selecting a content item in a game guide database based on the game objective, and providing, to the user device via the network connector, the content item to the user.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

In some embodiments described herein, a system for providing game guidance content is provided. The system uses a user device to record game generated audio, video, and/or images, which is used to identify the game and a game objective. The identified game objective is then used by a game guide server to provide relevant game guide content to assist the player in achieving the objective. In some embodiments, the game guide server is further configured to use an interactive voice response decision tree to identify relevant game guidance content. In some embodiments, the game guide server may further use game information captured by the user device (e.g. audio, visual information) and user input to generate a dynamic game guide by identifying potential objectives associated with a game and associating game guidance content with identified objectives.

Figure 1:
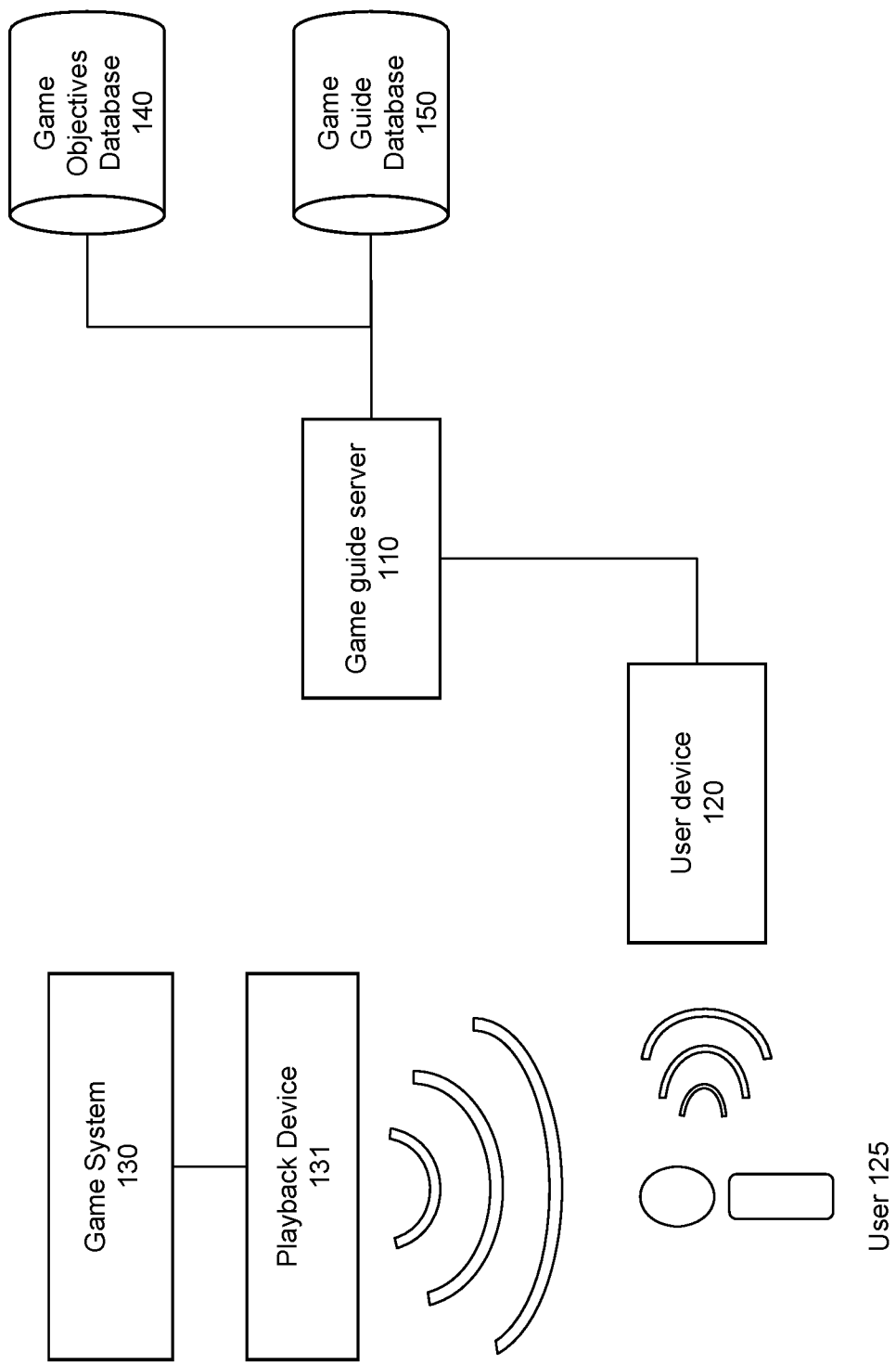
FIG. 1 is a block diagram illustrating a system for providing game guide in accordance with some embodiments of the present invention.

Referring first to FIG. 1, there is shown a system for providing game guidance. The system comprises a game system 130, a playback device 131 for interacting with a user 125, a user device 120, and a game guide server 110 coupled to a game objectives database 140 and a game guide database 150.

The game system 130 generally refers to a system for providing computer simulated game content. The game system 130 may comprise a processor-based device executing a set of computer-readable instructions associated with a video game stored on a computer-readable memory storage device. In some embodiments, the game system 130 may comprise one or more of a game console, a home entertainment console, a personal computer, a desktop computer, a laptop computer, and portable gaming device, a mobile device, a smartphone, a tablet computer, a virtual reality device, a mix reality device, and the like. In some embodiments, the game system 130 may be coupled to a network, such as the Internet, to provide game and other media content.

The playback device 131 generally refers to a user output device for outputting gameplay content to the user 125. The playback device 131 may comprise a video output and an audio output. In some embodiments, the playback device 131 may comprise one or more of a speaker, a headset, a television, a monitor, a home entertainment system, a virtual reality display, a mix reality display, a projection display, smart glasses, an Internet of Things (IoT) device, and the like. In some embodiments, the playback device 131 and/or the game system 130 further comprises one or more input devices such as a handheld controller, a motion sensor, an eye tracker, a keyboard, a mouse, a microphone, an optical sensor, the like. In some embodiments, the game system 130 and the playback device 131 may comprise a single integrated device such as a handheld game console, a smartphone, a laptop computer and the like.

The user device 120 generally comprises a device configured to interact with the user 125 via audio. In some embodiments, the user device 120 comprises a control circuit, a speaker, and a microphone. In some embodiments, the user device 120 may comprise other user input/output devices such as a display, a touch screen, a keyboard, buttons, a motion sensor, and the like. In some embodiments, the user device 120 may comprise one or more of a smart speaker, a voice assistance device, a mobile phone, a smartphone, a computer, a tablet device, a wearable device, smart glasses, an IoT device and the like. The user device 120 is generally configured to capture game audio from the playback device 131, receive voice commands from the user 125, and provide game guide content to the user 125. In some embodiments, the user device 120 is further configured to interact with the user via interactive voice response (IVR). In some embodiments, the user device 120 may further be configured to capture images from the playback device 131. The user device 120 may be independent and separate from the game system 130 and the playback device 131 and be configured to capture audio from both the playback device 131 and the user 125. For example, aside from the captured audio and/or images through a microphone and/or camera, the user device 120 may not have other data communication with the game system 130 and the playback device 131. In some embodiments, the user device 120 may be implemented on the same physical device as the game system 130 and/or the playback device 131. For example, an application on a smartphone may monitor the audio and/or video output of another application to provide game guidance. Further details of the user device 120 are described with reference to FIG. 2 herein.

The game guide server 110 generally refers to a networked device for providing game guide content to the user 125. The game guide server 110 comprises a network connector configured to communicate with a plurality of user devices 120 over a network such as the Internet. In some embodiments, the game guide server 110 is further configured to aggregate game information and organize game guide content based on information captured by a plurality of user device 120. In some embodiments, the game guide server 110 comprises a processor-based device executing a set of computer-readable codes stored on a computer-readable memory storage to provide game guide content via user devices and/or update a dynamic game guide. In some embodiments, the game guide server 110 may be implemented on a plurality of physical processor-based devices on a network. In some embodiments, the game guide server 110 may comprise a network-based, a cloud-based, and/or a distributed database-based server. Further details of the functions of the game guide server 110 are described with reference to FIG. 3-4 herein.

The game objectives database 140 generally comprises a computer-readable storage medium storing game and game objective information associated with a plurality of games. In some embodiments, the game objectives database 140 may store audio associated with a plurality of game objectives. A game objective generally refers to something a player wants to achieve in the game. Examples of game objectives may include, but not limited to, beating an enemy, solving a puzzle, getting to a location, obtaining an item/weapon/gear, unlocking a skill, unlocking an in-game event, finding a nonplayer character (NPC), unlocking a quest, progressing through a quest, completing a quest, getting through a dungeon, beating a level, and the like. The specific objectives and types of objectives associated with a game may be highly specific to the game's genre and content.

In some embodiments, the system may be configured to identify game objectives and update the game objectives database 140 based on capturing game information (e.g. audio, video, and/or images) and/or interacting with users. In some embodiments, game objectives may be identified based on identifying points of game where users often request game guidance. In some embodiments, game objectives may be identified based on in-game dialogue, alert sounds, and status indicating sounds. In some embodiments, game objectives may be identified based displayed text and/or images. In some embodiments, game objectives may be identified base on the content of the received game guide requests. For example, a game guide request from a user may specify an objective (e.g. "help me beat this boss," "how do I get out of this dungeon?" "where is the McGuffin?"). Game information such as audio segment, video, image content may then be associated with the content of the game guide request in the game objectives database 140. In some embodiments, the system may use a machine learning algorithm to identify possible game objectives using game audio recordings, user game guide requests, and user feedback to provided game guide items as inputs. In some embodiments, machine learning may identify the best strategies/skills/routes/powerups or weapons to achieve the game objective, and/or identify the best content which facilitates the achievement of the game objective. In some embodiments, the system may prompt the user to generate or link game guide content for identified game objectives.

In some embodiments, one or more objectives may further be associated with one or more game states. A game state generally refers to a combination of one or more game variables. Examples of game variables that may make up a game state may include, but is not limited to, completed objective, in-game location, character/party characteristics, character/party statistic, character/party ability, character/party equipment, items in possession, enemy characteristics, and the like. As used herein, a game state may include one or more game variables. In some embodiments, a game state used by the system need not include all variables tracked by the game itself and which may or may not directly correspond to a variable value used by the game software. In some embodiments, the game states in the game objectives database 140 may have a hierarchical relationship to each other and/or may be organized in a decision tree under a game and/or a game objective. In some embodiments, a game objective may have associated with it, one or more narrowing questions for determining one or more game states associated with the game objective. For example, a narrowing question may relate to the character's current equipment, whether the character has completed another objective, whether the play sees a specific item/feature on screen, etc. In some embodiments, narrowing questions may also be used to identify a game objective. In some embodiments, a game state may have associated with it, one or more game guide content in the game guide database 150. In some embodiments, game guide contents are tagged to terminal nodes of the game guidance decision tree. An example of a game guidance decision tree is provided with reference to FIG. 5 herein.

The game guide database 150 generally comprises a computer-readable storage medium storing game guide content items. In some embodiments, game guide content items may comprise text guide, audio guide, image, video, and/or link. In some embodiments, game guide content may comprise user-generated content, crowd-sourced guide content, web-based content, links to online game guide content, official guide content, third-party guide content, and/or machine-generated guide content. In some embodiments, the game guide database 150 may store copies of game guide content and/or store links to resources available on the internet (e.g. YouTube video, Twitch recording, FAQ, website, social media post etc.). In some embodiments, the game guide server 110 may be configured to populate the game guide database 150 based on user interactions and recordings of games. For example, a recording of a successful completion of an objective from one player may be provided to another player as a guide to achieve the objective. In some embodiments, the game guide server 110 may prompt users to add user-generated guide content to the game guide database 150 and may provide incentives (e.g. virtual currency, badges, virtual items) for user contribution. In some embodiments, the game guide server 110 may be configured to periodically crawl the web to aggregate game guide content and add the content the game guide database 150. In some embodiments, the system may perform a web search based on received game guide requests and add the search results to the game guide database 420. In some embodiments, the content of the game guide request, information associated with the game, the objective, and/or game state may be used as search queries to obtain additional game guide resources for the database.

In some embodiments, the game guide content items in the game guide database 150 may be tagged to one or more game objectives and/or game states in the game objectives database 140. In some embodiments, the system may be configured to associate game guide content items with game objectives and/or game states based on comparing the audio or video of an audio/video content item with the recorded game audio segment, comparing a transcript of the recorded game audio segment to text content, and/or comparing user provided information with text, audio, or visual information in the content item. In some embodiments, the game guide content items in the game guide database 150 may be ranked based on feedback received from users. In some embodiments, a game guide content item may be separately ranked for each of a plurality of game objectives and/or game state tracked in the game objectives database 140. In some embodiments, feedback for ranking game guide content items may comprise one or more of user response, user rating, and game progression detected based on an audio recording. In some embodiments, the system may assign confidence levels to one or more game objection/state and game guide content item associations and select game guide content items based on the associated confidence levels.

While the game objectives database 140 and the game guide database 150 are shown separately from the game guide server 110 in FIG. 1, in some embodiments, the game objectives database 140 and the game guide database 150 may be implemented on the computer-readable memory storage device of the game guide server 110. In some embodiments, the game objectives database 140 and the game guide database 150 may be implemented as a single database device and/or database structure. In some embodiments, the user device 120 may be configured to directly access one or more of the game objectives database 140 and the game guide database 150 to provide game guide information and/or update the databases.

Figure 2:
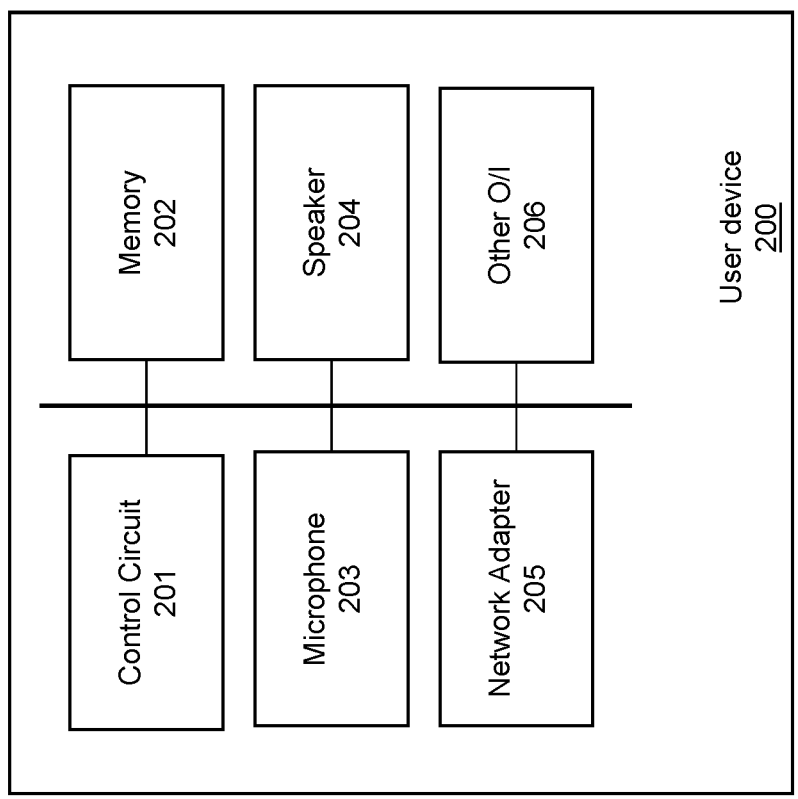
FIG. 2 is a block diagram illustrating a user device for providing game guide in accordance with some embodiments of the present invention.

Referring next to FIG. 2, there is shown an apparatus for providing game guidance. As shown in FIG. 2, a user device 200 comprises a control circuit 201, a memory 202, a microphone 203, and a network connector 205. The user device 200 may generally be a processor-based device such as a smart speaker, a virtual assistance device, a smart home system, a smartphone, a wearable device, an Internet of Things (IoT) device, a personal computer, a tablet computer, and the like. In some embodiments, the user device 200 may comprise a standalone device with no direct data communication with the game system and/or playback device such a game console, a computer system, a smartphone, a television, a home entertainment system, and the like. In some embodiments, the user device 200 may be integrated with a game system and/or a playback device. For example, the same device may execute the game and the game guidance application that captures and make use of the audio or video output of the game. The user device 200 is generally configured to record game audio, receive game guide request, and provide game guide information to the user based on communications with a remote server system and/or database. In some embodiments, the user device 200 may comprise the user device 120 described with reference to FIG. 1.

The control circuit 201 may comprise a processor, a microprocessor, a central processing unit, an integrated circuit, an application specific integrated circuit (ASIC), and the like. The control circuit 201 is configured to execute computer readable codes stored on the memory 202 to record game audio and provide game guidance to users. The memory 202 may comprise volatile and/or nonvolatile computer readable memory storage device configured to store computer executable codes. In some embodiments, the memory 202 may further store one or more of recordings of game audio, video, user profile information, and game-related information. In some embodiments, the memory 202 may comprise an audio buffer for buffering audio recorded by the microphone 203 such that game audio recorded prior to a game guide request is received may be retrieved in after the game guide request is detected. In some embodiments video and/or screenshot captures are buffered such that game video recorded prior to a game guide request is received may be retrieved after a game guide request is made. In some embodiments, the control circuit 201 and the memory 202 may execute and store other programs such as an operating system, a mobile application, a virtual assistant, a music player program, and the like. In some embodiments, the user device 200 may be a dedicated and standalone game guidance device.

The network connector 205 comprises a network device configured to allow the user device 200 to communicate over a network. In some embodiments, the network connector 205 may comprise a wireless data transceiver, a Wi-Fi transceiver, a mobile data transceiver, a Bluetooth transceiver, a wired data port, and the like. The control circuit 201 may communicate with a game guide server via the network connector 205 to provide game guidance to users.

The microphone 203 generally comprises an audio sensor for capturing sound around the user device 200. In some embodiments, the microphone 203 may capture game sound produced by a computer simulated game and produced by a playback device. In some embodiments, the microphone 203 may detect voice commands from the user such as a game guide request. The speaker 204 may generally comprise an audio output device configured to provide game guide information to the user. In some embodiments, the microphone 203 and the speaker 204 may be used to engage the user in interactive voice response to collect additional information for identifying relevant game objective and/or game state.

In some embodiments, the user device 200 may comprise other user input/output devices 206 such as a display screen, a touch screen, a projection display device, a keypad, indicator lights, buttons, a motion sensor, a gesture sensor, and the like. In some embodiments, the control circuit 201 may further be configured to provide visual game guidance via a display of the user device 200. In some embodiments, the control circuit 201 may provide a graphic user interface (GUI) for interacting with the game guidance service via user input/output devices of the user device 200. In some embodiments, the other user input/output devices 206 may comprise an optical sensor for capturing images from the video game. The captured images (video and/or still images) may also be used to identify game, game objective, and/or game state. For example, the system may perform text and/or object recognition on captured game images to obtain objects and/or text that may be used to identify game, game objective, and/or game state.

In some embodiments, the user device 200 comprises a thin client that provides captured audio to a server and playback content provided by the server. In some embodiments, the user device 200 may be configured to track game progress and locally determine the game objective and/or game state and select relevant game guide content from a networked or local database. In some embodiments, the user device 200 may be configured to perform one or more steps described with reference to FIGS. 3-4 herein. In some embodiments, the game guide server 110 may be omitted and the user device 200 may be configured to select game guide content based on captured audio by directly retrieving information from the game objectives database 140 and the game guide database 150.

Figure 3:
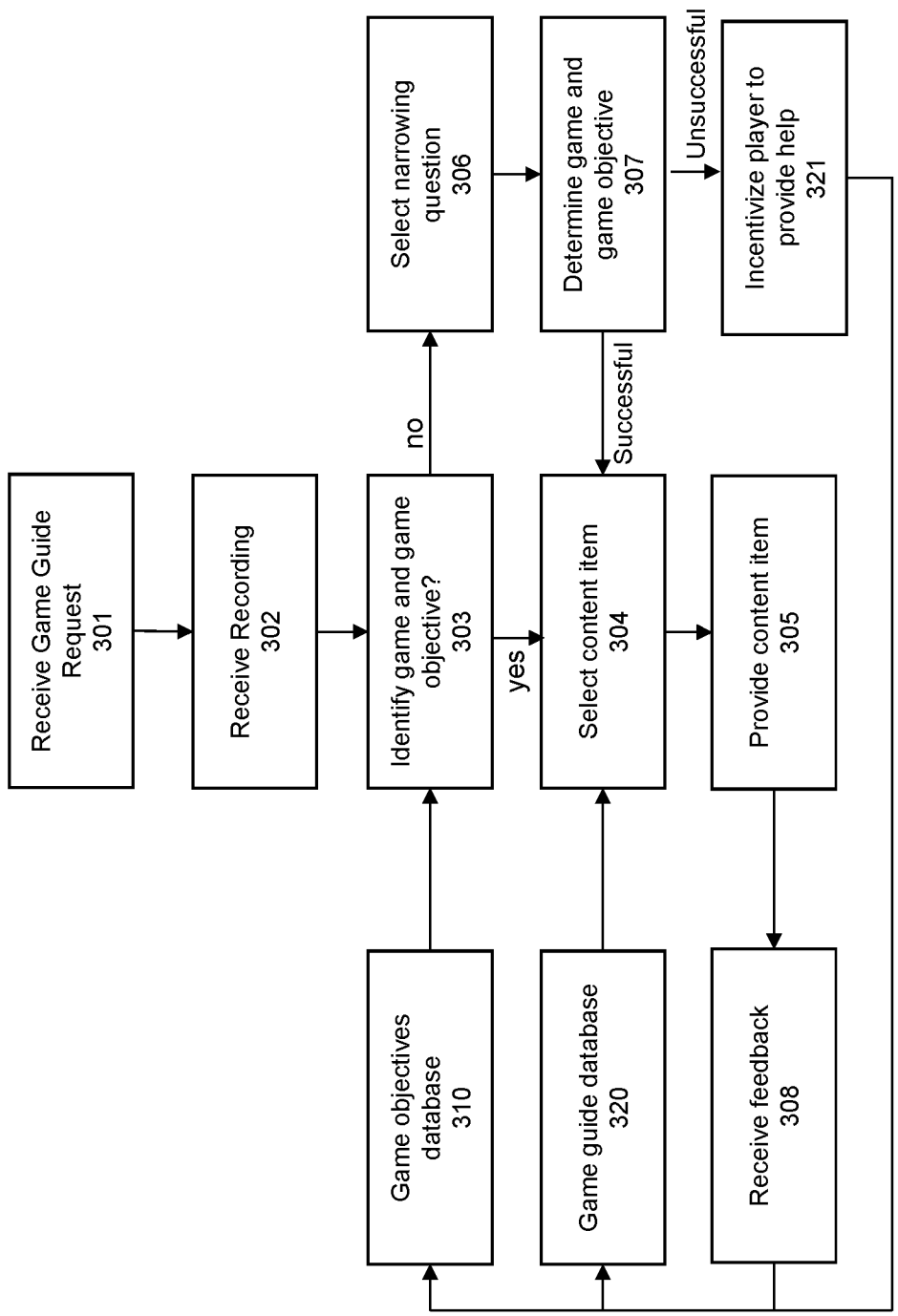
FIG. 3 is a flow diagram showing a method for providing game guide in accordance with some embodiments of the present invention.

Referring next to FIG. 3, there is illustrated an example of a method for providing game guidance to a user. In some embodiments, the steps shown in FIG. 3 may be performed by a user device at a user premises and/or a remote server configured to provide game guidance over a network via the user device. In some embodiments, one or more the steps shown in FIG. 3 may be performed by the user device 120 and the game guide server 110 described with reference to FIG. 1 and the user device 200 described with reference to FIG. 2 herein. Generally, the steps in FIG. 3 may be performed by one or more processor-based devices comprising a control circuit and a memory storing a set of computer-executable instructions.

In step 301, a game guide request is received. In some embodiments, the game guide request may comprise a voice command received at a user device. The system may comprise a voice recognition algorithm for identifying a voice command that comprises a request for game guidance versus other types of voice command, game sound, or background sound. In some embodiments, one or more specific phrases may be defined to trigger a game guide request (e.g. "help me with this game"). In some embodiments, the game guide request may comprise a question that the system may use to identify a game or an objective (e.g. "how do I get a horse?").

In step 302, the system receives a recording of a game from the user device. In some embodiments, the recording of the game may comprise one or more an audio segment, a video segment, and a still image. The recording of the game generally refers to audio and/or image generated by a computer simulated game, outputted via a playback device, and captured by a user device. In some embodiments, an audio segment of a game may comprise one or more of game dialogue audio, game background music, and game environmental sound produced by a playback device during gameplay. In some embodiments, the user device may be placed around a user playing a game and record sound around the user. In some embodiments, the audio segment may be recorded immediately after receiving the game guide request. In some embodiments, the user device may monitor game sounds and continuously buffer a set length of audio recording (e.g. 5 seconds, 10 seconds, etc.). With an audio buffer, the audio segment recorded prior to the user making the game guide request may be retrieved and used by the system. In some embodiments, the audio segment is uploaded to the server with or in response to receiving a game guide request. In some embodiments, the game, the game objective, and/or game state may be identified via a plurality of audio segments recorded by the user device over time. For example, the system may be configured to gather game state information continuously to aggregate a list of game states (e.g. items gathered so far, bosses beat, past NPC interactions, completed objectives, etc.) as the user play through the game, even in the absence of a game guide request.

In step 303, the system identifies the game and the game objective. In some embodiments, the game and/or the game objective is identified based on comparing the audio segment with game information stored in a game objectives database. In some embodiments, one or more game objectives in the game objectives database 310 are associated with previously recorded game audio. The game and/or the game objective may be identified based on comparing audio segment(s) associated with game objectives in the game objectives database 310 with game audio segment recorded by the user device associated with the user making the game guide request. In some embodiments, the game and/or the game objective may be identified based on the game guide request. For example, the user may identify an objective in the request (e.g. "how do I catch a chicken?"). In some embodiments, the game and/or the game objective may be further identified based on narrowing questions in step 306 and step 307. In some embodiments, the system may select a plurality of potential game objectives based on the audio segment and/or the game guide request, select a narrowing question based on a decision tree associated with the game, provide the narrowing question to the user device, and identifying the game objective from among the plurality of potential game objectives based on a response to the narrowing question. For example, if the audio segment is matched with a specific dungeon in the game, the narrowing question may ask the user to identify the floor or other text displayed on the screen. In some embodiments, a game objective may have associated with it, a plurality of branches associated with different game states that may be tagged with different game guide content. In such cases, steps 303-307 may be repeated for game states associated with an identified objective prior to proceeding to step 304. For example, if the audio or video segment is matched with a specific boss battle, the narrowing question may ask the user to identify their equipment and/or character abilities to determine a game state. Game guide content associated with the objective (e.g. beating the boss) and specific game state (e.g. character ability and equipment) may then be selected in step 304. In some embodiments, the content of the game guide request may also be used to identify a game state associated with an objective. For example, if the user asks "how do I beat this boss as an archer?" the system may determine the character class based on the game guide request without further narrowing questions. In some embodiments, steps 303-307 may be performed for each level of a hierarchical tree until a terminal node is reached prior to proceeding to step 304. An example of a game guide tree is described with reference to FIG. 5 herein. In some embodiments, the system is configured to identify the game, a game objective, and/or a game state associated with a game objective based on one or more of captured game audio, the content of the game guide request, and narrowing questions using interactive voice response.

In some embodiments, if the system is unable to determine a game and/or game objective in step 307, in step 321 the system may incentive the player to provide additional information relating to the game and/or game objective to help update the game objectives database 310 and/or the game guide database 320. In some embodiments, the system may prompt user to generate a game guide content once their objective is achieved. In some embodiments, the system may prompt to user to perform a keyword search for a guide content item in the game guide database 320 and/or online and link the guide content item to their game objective and/or game state.

The game objectives database 310 generally comprises a computer-readable storage medium storing game and game objective information associated with a plurality of games. In some embodiments, the game objectives database 310 comprises a plurality of game objectives identified based on game audio and/or game guidance requests recorded by the plurality of user devices. In some embodiments, the system may monitor the audio output of one or more game sessions to capture game objective information. In some embodiments, the game sessions may be recorded by a plurality of user devices and/or comprise user-uploaded content (e.g. game streaming broadcast, playthrough video recordings, etc.). In some embodiments, the system may record the content of game guide requests received over time as game objectives. In some embodiments, the system may use machine learning to identify possible game objectives using game audio recordings and user game guide requests as inputs. In some embodiments, game objectives and game states in the game objectives database are arranged in a decision tree determined via machine learning. In some embodiments, the game objectives and game states in the game objectives database may be determined at least partially based on one or more of official game guide, third-party game guide, web resources, user-generated content, and the like. In some embodiments, the game objectives, the game states, and the objective and game state associations may be dynamically updated based on interactions and feedback with users over time. In some embodiments, the game objectives database 310 may comprise the game objectives database 140 described with reference to FIG. 1 herein.

In step 304, the system selects a game guide content item from the game guide database to provide as game guidance to the user. In some embodiments, one or more game objectives in the game objectives database 310 is associated with one or more content items and the content item may be selected based on the game objective identified in step 303. In some embodiments, the system may navigate through the game guide decision tree based on information gathered in steps 303, 306, and 307 and provide game guidance content when a terminal node is reached. In some embodiments, the game guide content may be ranked based on previously received feedback, and the content item may be selected based on the ranking. In some embodiments, the system may perform A/B testing on a plurality of available content items by providing different content items to different users to determine and refine a ranking between the content items.

The game guide database 320 generally comprises a computer-readable storage medium storing game guide resources. In some embodiments, game guide content items may comprise text, audio, images, videos, and/or links. In some embodiments, game guide content may comprise official guide content, third-party guide content, user-generated guide content, crowdsourced guide content, web-based content, and/or machine-generated guide content. In some embodiments, the game guide database 320 may store copies of game guide content and/or store links or guide content available on the internet (e.g. YouTube video, Twitch recording, etc.). In some embodiments, the game guide content items in the game guide database 320 may be tagged to one or more game objectives and/or game states in the game objectives database 310. In some embodiments, the game guide content items in the game guide database 320 may be ranked based on feedback information. In some embodiments, a game guide content item may be separately ranked for each of a plurality of game objectives associated with the content item. In some embodiments, the rankings of game guide content items and the associations between game guide content items and game objectives and/or states may be dynamically updated based on interactions with users over time. In some embodiments, the game guide database 320 may comprise the game guide database 150 described with reference to FIG. 1 herein.

In step 305, the content item is provided to the user. In some embodiments, the content item may comprise a speech script and/or an audio clip that is provided via a speaker of the user device. In some embodiments, the content item may be displayed on a display screen of the user device or another device. In some embodiments, after step 305, the system may solicit feedback from the user in step 308. For example, the user device may ask the user "did that help?" or "did you find the item?" to receive a yes/no response from the user. In some embodiments, if the feedback is negative, the system may return to step 303 and/or 304 to provide further guidance. In some embodiments, the system may modify the game objectives database 310 and/or update game guide item rankings and/or confidence level based on the feedback. In some embodiments, the system may modify an association of the content item and the game objective based on the feedback. For example, if a content item received several negative feedbacks for a game objective, the system may disassociate the content item from the game objective such that the content item would not be provided to another user requesting game guide information for the objective. In some embodiments, the system may continue to monitor game audio and/or video after step 305 to determine whether the user has successfully completed the objective and/or progress in the game. The user's in-game progression may be used as feedback to further refine the game objectives database 310 and/or game guide database 320. For example, if the sound of a locked door opening is detected shortly after a game guide content item is provided, the opening sound may be treated as positive feedback.

In some embodiments, the steps shown in FIG. 3 may be repeated for each game guide request received at a user device. In some embodiments, a game guide server may execute multiple instances of the steps shown in FIG. 3 to provide game guidance service via a plurality of user devices over a network. In some embodiments, the game objectives database 310 and/or the game guide database 320 may be accessed to simultaneously provide game guidance at a plurality of user devices to a plurality of users. In some embodiments, the game objectives database 310 and/or the game guide database 320 may be continuously and dynamically updated based on game audio/video recordings and user interactions via a plurality of user devices.

While FIG. 3 generally describes the use of audio segments and recordings, in some embodiments, one or more steps described in FIG. 3 may also be performed on video and/or images captured from game play. In some embodiments, information extracted from game video and/or image captures may be used to identify game and/or game objective in step 303, select narrowing question in step 306, and/or select content item in step 304. For example, the system may perform text recognition to obtain the name of an enemy and select a game guide content item by matching content items with the name of the enemy. In another example, character statistics (e.g. class, strength, agility, intelligence) may be extracted from a screen capture of the character's status screen. In some embodiments, information extracted from videos and/or images may be used in addition to or in place of audio segment information for one or more steps described in FIG. 3.

Figure 4:
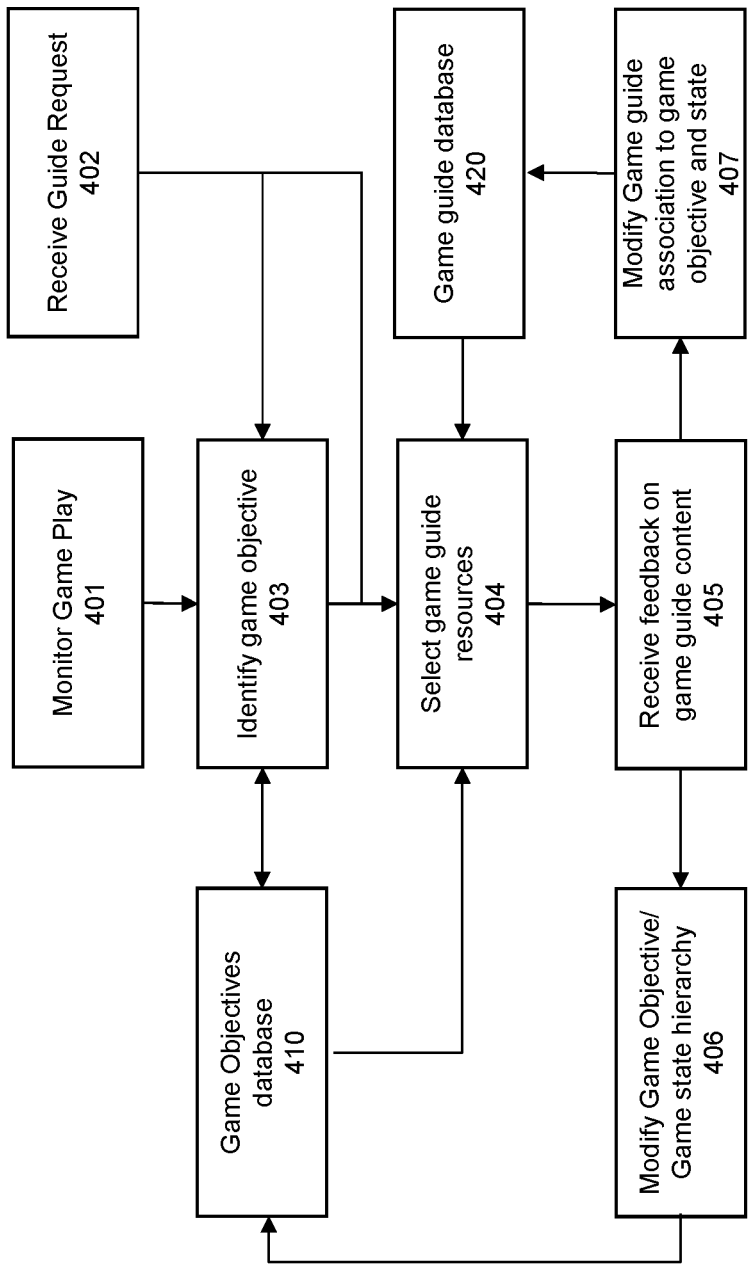
FIG. 4 is a flow diagram showing a method for generating and updating a dynamic game guide in accordance with some embodiments of the present invention.

Referring next to FIG. 4, there is illustrated an example of a method for aggregating and updating game guidance information according to some embodiments. In some embodiments, the steps shown in FIG. 4 may be performed by a user device at a user premises and/or a remote server configured to provide game guidance. In some embodiments, one or more the steps shown in FIG. 4 may be performed by the user device 120 and the game guide server 110 described with reference to FIG. 1 and the user device 200 described with reference to FIG. 2 herein. Generally, the steps in FIG. 4 may be performed by one or more processor-based devices comprising a control circuit and a memory storing a set of computer-executable instructions.

In step 401, the system records and monitors game audio. In some embodiments, step 401 may be performed with one or more audio/video capture device such as a user device 120 and user device 200. In some embodiments, step 401 comprises recording audio in an audio buffer. The buffered audio is provided to a server when a user makes a game guild request. In some embodiments, step 401 comprises continuously recording and upload audio/video to the server during a gaming session. In some embodiments, the system provides users an incentive (e.g. digital currency, badges, etc.) to continuously record their gameplay for the purpose of building a game guide. In some embodiments, the system may identify game objectives based on game sounds such as in-game dialogue, alert sounds, and sounds associated with the completion of an objective (e.g. battle won, door opened, quest completed, puzzle solved, etc.), or game video (boss defeated, weapon or skill unlocked etc.)

In step 402, the system receives a game guide request from a user. In some embodiments, the game guide request may comprise a voice command. In step 403, a game objective may be identified based on the content of the game guide request and/or the game audio captured just before, during, or after the game guide request is made. In some embodiments, the system may compare the recorded audio segment with audio segments in the game objectives database 410 to determine whether the audio segment matches an existing objective. In some embodiments, the system may compare the content of the game guide request with the game objectives database 410 to determine whether the game guide request matches an existing objective. In some embodiments, if multiple game objectives can be matched with the audio segment and/or the game guide request, the system may ask narrowing questions based on a decision tree to obtain more information associated with the game objective and/or game state.

If no match is found between game guide request and an existing game objective, a new game objective may be created in the game objectives database 410. For a new game, the system may monitor multiple playthroughs of the game to populate the game objectives database 410 with possible objectives. When a new objective or a new state associated with an objective is identified, in step 404, the system may match the new game objective and/or state with one or more game guide content items. In some embodiments, the content items may be matched to game objectives and states based on comparing the audio of an audio/video content item with the recorded game audio segment, comparing a transcript of the recorded game audio segment to text content, and/or comparing user provided information with text, audio, or visual information in the game guidance content item. In some embodiments, the system may aggregate new game guide content in the game guide database and periodically match new game guide content items to existing game objectives and/or states in the game objectives database 410 to build up a dynamic game guide. In some embodiments, recorded game audio and/or game guide request may be used as search queries to search for game guide content in the game guide database 420 and/or on the web.

If the audio segment and/or game guide request can be matched with an existing objective in the game objectives database 410, the system may select a game guide resource associated with the existing game objective from the game guide database 420. In some embodiments, the system may use a voice response decision tree to identify the objective and/or game state and select the game guide resource based on the response.

In step 405, the system receives feedback on the provided game guide content. In some embodiments, the feedback may comprise a user vocal feedback, a gesture feedback, a graphical user interface selection, and/or a change in monitored game audio. The feedback information may be used to update the game objectives database 410 in step 406 and/or update the game guide database in step 407. If the feedback is positive, the system may increase a confidence level of the game objective and/or game objective hierarchy in the game objectives database 410 in step 406. The system may further increase a relative ranking of the provided game guide content item in the game guide database in step 407. If the feedback is negative, the system may reduce the ranking of the provided game guide content in step 407. In some embodiments, the system may further reduce the confidence level of a decision tree node placement and/or change the hierarchical arrangement of a game state based on a negative feedback in step 406. In some embodiments, the feedback received in step 405 may be used by a machine learning algorithm to add to, update, and modify game objectives, game states, and game guide associations in the game objectives database 410 and the game guide database 420. Feedback information may also be aggregated over time to determine confidence levels associated with game objectives, game states, and game guide content item associations. The steps shown in FIG. 4 may generally be continuously repeated to update and refine a dynamic game guide while providing game guide content to users.

While FIG. 4 generally describes the use of audio segments and recordings, in some embodiments, one or more steps described in FIG. 4 may be performed based on video and/or images captured from game play. In some embodiments, information extracted from game video and/or image captures may be used to identify game and/or game objective in step 403 and select game guide resource in step 404. Game objectives and states in the game objective database 410 may be associated with information from video/image captures (e.g. text, object recognition). For example, an objective associated with solving puzzle may be tagged with the text displayed along with the puzzle on screen and/or an image of the puzzle in the game objectives database 410. In some embodiments, information extracted from videos and/or images may be used in addition to or in place of audio segment information for one or more steps described in FIG. 4.

Figure 5:
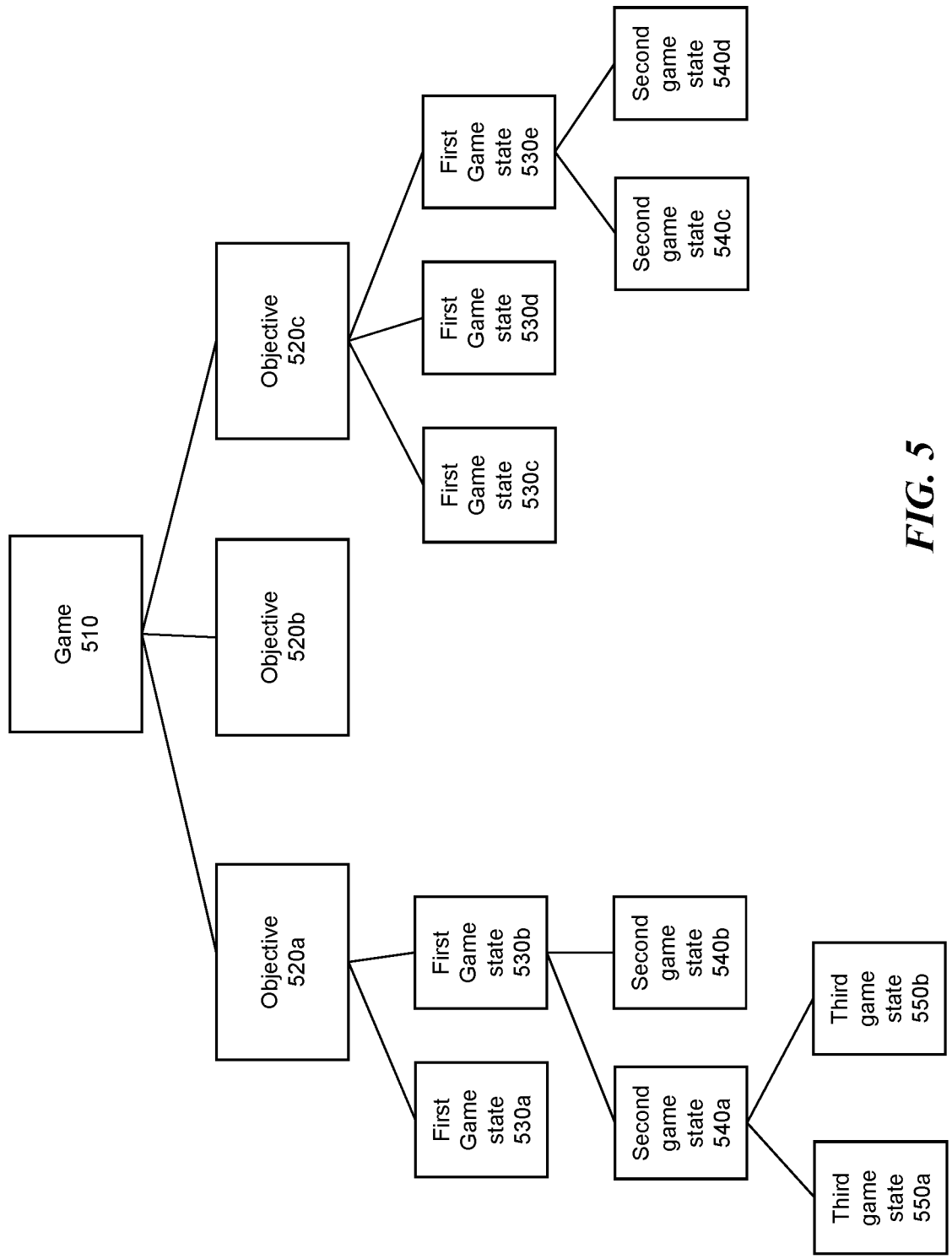
FIG. 5 is an illustration of a tree diagram of game objectives and game states in accordance with some embodiments of the present invention.

Referring next to FIG. 5, there is illustrated an example of a game guide tree of game objectives and game states according to some embodiments. As shown in FIG. 5, each game 510 in a game objectives database may be associated with a plurality of objectives 520a, 520b, and 502c. A game objective may generally refer to something a player wants to achieve in the game. Examples of game objectives may include, but not limited to, beat an enemy, solve a puzzle, get to a location, obtain an item/weapon/gear, learn a skill, unlock an in-game event, find a nonplayer character (NPC), start a quest, progress through a quest, complete a quest, get through a dungeon, beat a level, and the like. The specific objectives and types of objectives associated with a game may be highly specific to each game. In some embodiments, each objective may have one or more audio segments, videos, and/or images associated with the objective. The system may identify the objective based on the content of user's game guide request and/or by matching captured game information with game information associated with the objective. In some embodiments, the system may further be configured to ask narrowing question(s) to select between possible objectives if a plurality of possible matches are found. For example, if the player asks "how do I open the chest?" and the captured game audio indicates that the player is a specific dungeon with three chests, the system may attempt to determine the user's in-game location by asking a narrowing question such as "which floor are you on?"

In some embodiments, an objective may be a terminal node in the game guide tree, such as objective 520b. In such cases, once the objective is identified, the system may provide associated game guide content without further determination. Objective 520b may represent an objective whose solution is largely independent of game states. For example, if the objective is to obtain a specific item, and the item can be obtained by traveling to a specific location without further requirements, the objective may be a terminal node, and the game guide content may be provided without determining game state information.

In some embodiments, the objective may have associated with it, one or more levels of game states. Objects with associated game states, such as objective 520a and objective 520c may have different solutions and/or tips based on the game state. In one example, the objective 520b may be a side quest with multiple stages. The first game states 530a and 530b may correspond to the first stage (e.g. whether the player has met NPC1), and second game states 540a and 540b may correspond to the second stage (e.g. whether the player has obtained x number of items), and the third game states 550a and 550b may correspond to the third stage (e.g. whether the player has traveled to a specific location). A specific tip or solution may be associated with each terminal node under the objective 520b. In another example, the objective 520c may be to beat a specific enemy. The first game states 530c, 530d, and 530e, may correspond to the character class (e.g. warrior, mage, etc.), and the second game states 540c and 540d may correspond to available character skills. Specific solution/tip may be associated with each terminal node that could help the player beat the enemy. Within the same game and within the same objective, game states considered in each branch may vary depending on game design.

In some embodiments, the system may first attempt to identify the game 510, an objective, and any relevant game state information using recorded game information (e.g. audio, visual information) and/or the game guide request. In some embodiments, the system may track the current objective and game states based on monitoring game audio over time. For example, the system may be configured to automatically determine a player class based on combat sounds prior to receiving a game guide request for a game objective that is associated with a game state related to player class. If a terminal node (objective or state) cannot be identified by audio recording and/or the content of the game guide request, the system may use narrowing questions to get to a next level node in the tree. In some embodiments, one or more objectives and levels of game states may have associated with it, one or more narrowing questions configured to obtain additional information. For example, if the system is unable to determine whether a player has an item necessary to complete a side quest, the system may ask the player with a voice prompt (e.g. "do you have an rope in your inventory?") and select from among the game state nodes based on the user response. In some embodiments, the system may continue to prompt for additional information via a voice response decision tree algorithm until a terminal node is reached. A game guide content item associated with the terminal may then be provided to the user.

In some embodiments, the system may be configured to modify the game guide tree based on game audio and/or user feedback. For example, a new game state may be added under an objective if a player's response to a narrowing question does not match an existing game state. In another example, a terminal node may be changed to an intermediate node if the provided game guide content receives negative feedback and the system determines that game state information is needed to select an applicable game guide content. In some embodiments, the nodes of the game guide tree may be added, removed, and rearranged based on a machine learning algorithm using game audio, game guide requests, answers to narrowing questions, and/or feedback as a learning set.

FIG. 5 is provided as an example only, a game may comprise any number of objectives and each objective may be associated with any number of game states. Each level of game guide tree may further include any number of branches.

In some embodiments, one or more of the embodiments, methods, approaches, and/or techniques described above may be implemented in one or more computer programs or software applications executable by a processor-based apparatus or system. By way of example, such processor-based apparatuses or systems may comprise a computer, entertainment system, game console, workstation, graphics workstation, server, client, portable device, pad-like device, etc. Such computer program(s) may be used for executing various steps and/or features of the above-described methods and/or techniques. That is, the computer program(s) may be adapted to cause or configure a processor-based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above-described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer-readable storage mediums storing one or more computer programs adapted or configured to cause a processor-based apparatus or system to execute steps comprising: receiving, via a network connector, a game guide request from a user, receiving, via the network connector, an audio segment recorded from a game by a user device associated with the user, identifying the game and a game objective from a game objectives database based on the audio segment, selecting a content item in a game guide database based on the game objective, and providing, to the user device via the network connector, the content item to the user.

While the invention herein disclosed has been described by means of specific embodiments and applications thereof, numerous modifications and variations could be made thereto by those skilled in the art without departing from the scope of the invention set forth in the claims.

What is claimed is:

1. A system for providing game guidance content, comprising:
   a game guide database;
   a game objectives database;
   a network connector configured to communicate with a plurality of user devices over a network; and
   a control circuit coupled to the game guide database, the game objectives database, and the network connector, the control circuit being configured to:
     receive, via the network connector, a game guide request from a user;
     receive, via the network connector, an audio segment recorded from a game by a user device associated with the user;
     identify the game and a game objective from the game objectives database based on the audio segment, wherein the game objective comprises something a player wants to achieve in the game;
     select a content item in the game guide database based on the game objective; and
     provide, to the user device via the network connector, the content item to the user;
   wherein the audio segment is recorded by the user device prior to receiving the game guide request.

2. The system of claim 1, wherein the audio segment comprises game dialogue audio, game background music, and/or game environmental sound produced by a playback device during gameplay.

3. A system for providing game guidance content, comprising:
   a game guide database;
   a game objectives database;
   a network connector configured to communicate with a plurality of user devices over a network; and
   a control circuit coupled to the game guide database, the game objectives database, and the network connector, the control circuit being configured to:
     receive, via the network connector, a game guide request from a user;
     receive, via the network connector, an audio segment recorded from a game by a user device associated with the user;
     identify the game and a game objective from the game objectives database based on the audio segment, wherein the game objective comprises something a player wants to achieve in the game;
     select a content item in the game guide database based on the game objective; and provide, to the user device via the network connector, the content item to the user;
wherein the game objective is identified further based on:
selecting a plurality of potential game objectives based on the audio segment;
selecting a narrowing question based on an interactive voice response decision tree;
providing the narrowing question to the user device;
identifying the game objective based on a response to the narrowing question.

4. A system for providing game guidance content, comprising:
a game guide database;
a game objectives database;
a network connector configured to communicate with a plurality of user devices over a network; and
a control circuit coupled to the game guide database, the game objectives database, and the network connector, the control circuit being configured to:
receive, via the network connector, a game guide request from a user;
receive, via the network connector, an audio segment recorded from a game by a user device associated with the user;
identify the game and a game objective from the game objectives database based on the audio segment, wherein the game objective comprises something a player wants to achieve in the game;
select a content item in the game guide database based on the game objective; and
provide, to the user device via the network connector, the content item to the user;
wherein the content item is selected further based on:
providing a narrowing question associated with the game objective to the user device;
identifying a game state based on a response to the narrowing question; and
selecting the content item based on the game objective and the game state.

5. A system for providing game guidance content, comprising:
a game guide database;
a game objectives database;
a network connector configured to communicate with a plurality of user devices over a network; and
a control circuit coupled to the game guide database, the game objectives database, and the network connector, the control circuit being configured to:
receive, via the network connector, a game guide request from a user;
receive, via the network connector, an audio segment recorded from a game by a user device associated with the user;
identify the game and a game objective from the game objectives database based on the audio segment, wherein the game objective comprises something a player wants to achieve in the game;
select a content item in the game guide database based on the game objective; and
provide, to the user device via the network connector, the content item to the user;
wherein the content item is selected further based on ranking a plurality of content items associated with the game objective based on feedback information.

6. A system for providing game guidance content, comprising:
a game guide database;
a game objectives database;
a network connector configured to communicate with a plurality of user devices over a network; and
a control circuit coupled to the game guide database, the game objectives database, and the network connector, the control circuit being configured to:
receive, via the network connector, a game guide request from a user;
receive, via the network connector, an audio segment recorded from a game by a user device associated with the user;
identify the game and a game objective from the game objectives database based on the audio segment, wherein the game objective comprises something a player wants to achieve in the game;
select a content item in the game guide database based on the game objective; and
provide, to the user device via the network connector, the content item to the user;
wherein the control circuit is further configured to:
receive feedback on the content item, wherein the feedback comprises one user response, user rating, and/or game progression detected based on an audio recording; and
modify an association of the content item and the game objective based on the feedback.

7. A system for providing game guidance content, comprising:
a game guide database;
a game objectives database;
a network connector configured to communicate with a plurality of user devices over a network; and
a control circuit coupled to the game guide database, the game objectives database, and the network connector, the control circuit being configured to:
receive, via the network connector, a game guide request from a user;
receive, via the network connector, an audio segment recorded from a game by a user device associated with the user;
identify the game and a game objective from the game objectives database based on the audio segment, wherein the game objective comprises something a player wants to achieve in the game;
select a content item in the game guide database based on the game objective; and
provide, to the user device via the network connector, the content item to the user;
wherein the game objectives database comprises a plurality of game objectives identified based on game audio and game guide requests recorded by the plurality of user devices.

8. The system of claim 7, wherein game objectives in the game objectives database are arranged in a decision tree determined via machine learning.

9. The system of claim 7, wherein the game guide database comprises text guide, audio guide, video guide, user-generated content, and/or links to online game guide content.

10. A method for providing game guidance content, comprising:
receiving, via a network connector coupled to a control circuit, a game guide request from a user;
receiving, via the network connector, an audio segment recorded from a game by a user device associated with the user;

identifying, with the control circuit, the game and a game objective from a game objectives database based on the audio segment, wherein the game objective comprises something a player wants to achieve in the game;

selecting, with the control circuit, a content item in a game guide database based on the game objective; and providing, to the user device via the network connector, the content item to the user;

wherein the audio segment is recorded by the user device prior to receiving the game guide request.

11. The method of claim 10, wherein the audio segment comprises game dialogue audio, game background music, and/or game environmental sound produced by a playback device during gameplay.

12. A method for providing game guidance content, comprising:
  receiving, via a network connector coupled to a control circuit, a game guide request from a user;
  receiving, via the network connector, an audio segment recorded from a game by a user device associated with the user;
  identifying, with the control circuit, the game and a game objective from a game objectives database based on the audio segment, wherein the game objective comprises something a player wants to achieve in the game;
  selecting, with the control circuit, a content item in a game guide database based on the game objective; and
  providing, to the user device via the network connector, the content item to the user;
  wherein the game objective is identified further based on:
  selecting a plurality of potential game objectives based on the audio segment;
  selecting a narrowing question based on an interactive voice response decision tree;
  providing the narrowing question to the user device;
  identifying the game objective based on a response to the narrowing question.

13. A method for providing game guidance content, comprising:
  receiving, via a network connector coupled to a control circuit, a game guide request from a user;
  receiving, via the network connector, an audio segment recorded from a game by a user device associated with the user;
  identifying, with the control circuit, the game and a game objective from a game objectives database based on the audio segment, wherein the game objective comprises something a player wants to achieve in the game;
  selecting, with the control circuit, a content item in a game guide database based on the game objective; and
  providing, to the user device via the network connector, the content item to the user;
  wherein the content item is selected further based on:
  providing a narrowing question associated with the game objective to the user device;
  identifying a game state based on a response to the narrowing question; and
  selecting the content item based on the game objective and the game state.

14. A method for providing game guidance content, comprising:
  receiving, via a network connector coupled to a control circuit, a game guide request from a user;
  receiving, via the network connector, an audio segment recorded from a game by a user device associated with the user;
  identifying, with the control circuit, the game and a game objective from a game objectives database based on the audio segment, wherein the game objective comprises something a player wants to achieve in the game;
  selecting, with the control circuit, a content item in a game guide database based on the game objective; and
  providing, to the user device via the network connector, the content item to the user;
  wherein the content item is selected further based on ranking a plurality of content items associated with the game objective based on feedback information.

15. A method for providing game guidance content, comprising:
  receiving, via a network connector coupled to a control circuit, a game guide request from a user;
  receiving, via the network connector, an audio segment recorded from a game by a user device associated with the user;
  identifying, with the control circuit, the game and a game objective from a game objectives database based on the audio segment, wherein the game objective comprises something a player wants to achieve in the game;
  selecting, with the control circuit, a content item in a game guide database based on the game objective; and
  providing, to the user device via the network connector, the content item to the user;
  further comprising:
  receive feedback on the content item, wherein the feedback comprises user response, user rating, and/or game progression detected based on an audio recording; and
  modify an association of the content item and the game objective based on the feedback.

16. A method for providing game guidance content, comprising:
  receiving, via a network connector coupled to a control circuit, a game guide request from a user;
  receiving, via the network connector, an audio segment recorded from a game by a user device associated with the user;
  identifying, with the control circuit, the game and a game objective from a game objectives database based on the audio segment, wherein the game objective comprises something a player wants to achieve in the game;
  selecting, with the control circuit, a content item in a game guide database based on the game objective; and
  providing, to the user device via the network connector, the content item to the user;
  wherein the game objectives database comprises a plurality of game objectives identified based on game audio and game guide requests recorded by a plurality of user devices.

17. The method of claim 16, wherein game objectives in the game objectives database are arranged in a decision tree determined via machine learning.

18. A non-transitory computer-readable storage medium storing one or more computer programs configured to cause a processor-based system to execute steps comprising:
  receiving, via a network connector, a game guide request from a user;
  receiving, via the network connector, an audio segment recorded from a game by a user device associated with the user;
  identifying the game and a game objective from a game objectives database based on the audio segment, wherein the game objective comprises something a player wants to achieve in the game;

selecting a content item in a game guide database based on the game objective; and providing, to the user device via the network connector, the content item to the user;

wherein the audio segment is recorded by the user device prior to receiving the game guide request.

\* \* \* \* \*